*US009392009B2*

(12) United States Patent
Droz et al.

(10) Patent No.: US 9,392,009 B2
(45) Date of Patent: Jul. 12, 2016

(54) OPERATING A NETWORK MONITORING ENTITY

(75) Inventors: Patrick Droz, Rueschlikon (CH); Robert Haas, Adliswil (CH); Andreas Kind, Kilchberg (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1534 days.

(21) Appl. No.: 12/281,357

(22) PCT Filed: Mar. 1, 2007

(86) PCT No.: PCT/IB2007/050669
§ 371 (c)(1),
(2), (4) Date: Apr. 21, 2009

(87) PCT Pub. No.: WO2007/099507
PCT Pub. Date: Sep. 7, 2007

(65) Prior Publication Data
US 2009/0222924 A1    Sep. 3, 2009

(30) Foreign Application Priority Data
Mar. 2, 2006   (EP) .................................. 06110601

(51) Int. Cl.
| | | |
|---|---|---|
| *G06F 7/04* | (2006.01) | |
| *G06Q 30/00* | (2012.01) | |
| *G06F 9/45* | (2006.01) | |
| *H04L 29/06* | (2006.01) | |
| *H04W 76/04* | (2009.01) | |
| *H04L 12/26* | (2006.01) | |

(52) U.S. Cl.
CPC ............. *H04L 63/1425* (2013.01); *H04L 43/04* (2013.01); *H04W 76/046* (2013.01)

(58) Field of Classification Search
CPC ....... H04W 12/08; H04W 8/02; H04W 12/00; H04L 63/145; H04L 63/1458; H04L 2463/141; H04L 63/1416; H04L 63/1433; H04L 63/1441; H04L 47/10; H04M 15/58; H04M 2215/0188; G06F 9/542
USPC .............................................. 726/22; 370/401
See application file for complete search history.

(56) References Cited

U.S. PATENT DOCUMENTS

| | | | | |
|---|---|---|---|---|
| 7,055,030 | B2 * | 5/2006 | Negawa ........................ 713/163 |
| 7,376,090 | B2 * | 5/2008 | Horng ................. H04L 12/2602 370/252 |
| 7,386,888 | B2 * | 6/2008 | Liang et al. ...................... 726/23 |
| 7,483,384 | B2 * | 1/2009 | Bryant .................... H04L 43/18 370/252 |
| 7,624,446 | B1 * | 11/2009 | Wilhelm ............. H04L 63/1416 380/255 |

(Continued)

OTHER PUBLICATIONS

Chuah, et al, "QoS Provisioning Using A Clearing House Architecture", http://www.ece.usdavis.edu/~chuah/paper/clearinghouse.pdf (2000).

(Continued)

*Primary Examiner* — Arvin Eskandarnia
*Assistant Examiner* — Margishi Desai
(74) *Attorney, Agent, or Firm* — Cantor Colburn LLP; David Quinn

(57) ABSTRACT

Network flow records from various administrative domains are provided to a network monitoring entity. The network monitoring entity analyzes the network flow records in a way to locate a source of malicious network flow.

18 Claims, 2 Drawing Sheets

(56) References Cited

U.S. PATENT DOCUMENTS

| | | | | |
|---|---|---|---|---|
| 7,657,935 | B2* | 2/2010 | Stolfo | H04L 63/1425 709/206 |
| 7,712,134 | B1* | 5/2010 | Nucci | H04L 63/145 713/172 |
| 7,712,136 | B2* | 5/2010 | Sprosts | G06Q 10/107 726/24 |
| 7,849,500 | B2* | 12/2010 | Rosenberger | H04L 12/2602 726/22 |
| 8,370,936 | B2* | 2/2013 | Zuk | H04L 63/0254 713/151 |
| 2003/0084327 | A1* | 5/2003 | Lingafelt et al. | 713/200 |
| 2003/0105976 | A1 | 6/2003 | Copeland | |
| 2003/0145231 | A1* | 7/2003 | Poletto | H04L 63/1408 726/22 |
| 2003/0167402 | A1* | 9/2003 | Stolfo et al. | 713/200 |
| 2003/0223367 | A1* | 12/2003 | Shay et al. | 370/231 |
| 2004/0071130 | A1* | 4/2004 | Doerr et al. | 370/352 |
| 2004/0218615 | A1* | 11/2004 | Griffin et al. | 370/401 |
| 2005/0149566 | A1* | 7/2005 | Baek et al. | 707/104.1 |
| 2005/0157662 | A1 | 7/2005 | Bingham | |
| 2005/0283837 | A1* | 12/2005 | Olivier et al. | 726/24 |
| 2006/0174028 | A1* | 8/2006 | Zhu | H04L 63/1408 709/232 |
| 2006/0277259 | A1* | 12/2006 | Murphy | H04L 51/12 709/206 |
| 2007/0079379 | A1* | 4/2007 | Sprosts et al. | 726/24 |
| 2008/0276317 | A1* | 11/2008 | Chandola | H04L 63/1425 726/23 |
| 2009/0019531 | A1* | 1/2009 | Rosenberger | H04L 12/2602 726/4 |
| 2009/0254971 | A1* | 10/2009 | Herz | G06Q 10/10 726/1 |

OTHER PUBLICATIONS

Chuah, et al, "Resource Provisioning Using a Clearing House Architecture", http://www.ece.usdavis.edu/~chuah/research/CHabstract.html (2000).

Claise, B., "Specification of the IP Flow Information Export (IPFIX) Protocol for the Exchange of IP Traffic Flow Information", www.ietf.org/rfc/rfc5101.txt (Jan. 2008).

Sadasivan, et al, "Architecture for IP Flow of Information Export", http://www.ieff.org/internet-drafts/draft-ieff-ipfix-architecture-12.txt (Sep. 2006).

Zou, et al, "The Monitoring and Early Detection of Internet Worms", IEEE Trans. Networking, vol. 13, No. 5, Oct. 2005.

* cited by examiner

OPERATING A NETWORK MONITORING ENTITY

TECHNICAL FIELD

The present invention relates to a method for operating a network monitoring entity, in particular a trusted entity. It further relates to a network monitoring entity, in particular a trusted entity, and to a computer program product for operating the network monitoring entity.

BACKGROUND OF THE INVENTION

The Internet is becoming a more and more complex system with an ever increasing number of users, and an increasing heterogeneity of devices, applications, hardware and software platforms and with distributed administration. In this context, companies using the Internet increase in multitude and some seem to be very hard to get hold of. Spam mail is becoming a problem for Internet users, except for the ones who produce this. A massive daily amount of spam traffic is annoying Internet service providers (ISPs) and end-users. Internet service providers are getting black-listed because some entities register them as originators of spam, which is in many cases not true. Another example of problems of current Internet is the distribution of illegal material over the Internet. Yet another example is the many P2P applications like file-sharing applications that are illegal. The movie and music industry is heavily suffering from these applications. Up to now, it is very hard or even impossible to identify and track down the people or organizations causing these problems.

An important task of network devices is to forward and distribute data as, for example, performed by routers and switches. Network devices are often designed to export information on the network traffic they process. Such information can, for example, be used for billing purposes or to monitor traffic for load balancing or to detect malicious traffic, e.g. a denial of service attack.

A commonly used level for presenting information on network traffic that allows a deeper and more sophisticated analysis of the network traffic is based on network flows. A network flow may be defined as a set of data packets passing an observation point in the network during a given time interval. All data packets belonging to a particular network flow have a set of common properties. Each property is defined as the result of applying a function to the values of one or more parts of the data packets. A commonly used data format in which network flow information can be exported is defined by Cisco's proprietary network flow profiling system, Net flow, as, for example, described in the manual, "Cisco IOS Release 12.0(5)T". An open, general and flexible standard called IPFIX (Internet Protocol Network flow Information eXport) is currently being standardized by an "IETF" (Internet Engineering Task Force) work group. The current status of this standardization is available under the title, "Architecture For IP Network flow Information Export Draft-IETF-IPFIX-Architecture-09" since Aug. 15, 2005 and was printed out on Jan. 14, 2006 and is available under "http://www.IETF.org/Internet-Drafts/Draft-IETF-IPFIX-architecture-09.txt".

Cliff Z. Zou, Weibo Gong, Don Towsley and Lixin Gao disclose in the publication, "Monitoring And Early Detection For Internet Worms", IEEE Trans. Networking, vol 13, no 5, October 2005, previously published in the Proceedings of the ACM Conference on Computer and Communication Security, 2003, techniques for monitoring and detecting Internet worms. An exponential model Kalman filter is used for early detection. The disclosure is restricted to a localized approach.

The Internet publication, "Resource provision and using a clearing house architecture" by C. N. Chuah, L. Subramanian, R. H. Katz and A. D. Joseph, available in the Internet under http://www.ece.ucdavis.edu/~chuah/research/CHabstract.html, printed out on Mar. 23, 2004, and also published at the conference IWQoS 2000, discloses a clearing house that attempts to provide a better quality of service assurance and higher network utilization as offered by stateful networks, while maintaining the scalability of a stateless network architecture. Various clearing house notes keep track of the intra- and inter-domain traffic patterns and adapt aggregate reservations dynamically based on "Gaussian traffic predictors". The clearing house architecture proposed in this paper can inter-operate with MPLS, OSPF and queuing mechanisms like Core-Stateless Fair Queuing (CSFQ). The clearing houses may be used to provide an Internet service provider for VPN or VoIP traffic and to achieve better quality of the service assurance across multiple domains.

The Department of Information Technology of the Ministry of Communications and IT of India has set up CERT-IN. Information about CERT-IN is available in the Internet under http://www.cert-in.org. The purpose of CERT-IN is to become the Indian nation's most trusted referral agency of the Indian community for responding to computer security incidents as and when they occur. CERT-IN also assists members of the Indian community in implementing pro-active measures to reduce the risks of computer security incidents. Its functions are a central point for reporting Internet incidents, providing a database of incidents, performing analysis of trends and patterns of intruder activities, incident tracing, vulnerability analysis and issuance of alerts, and profiling attackers. The incident tracing feature of CERT-IN is merely a reactive system.

The Internet publication "QoS Provisioning Using a Clearing House Architecture", available in the Internet under http://www.ece.ucdavis edu/~chuah/paper/clearinghouse-.pdf, from ChenNee Chuah discloses to perform network flow aggregation for reservations and policing, hierarchical control for inter-domain reservations and traffic-matrix based admission control which should lead to a better quality of service by leveraging knowledge of global demand distributions. It discloses to implement clearing house nodes as resource managers. The clearing house functionalities are to monitor network performance, estimate traffic demand distributions and to coordinate traffic pulsing for detecting misbehaving network flows. A clearing house node has to be associated with each logical domain. It, amongst other, performs group policing for malicious network flow detection.

It is, therefore, a challenge to provide a method for operating a trusted entity, which enables a more effective analysis of malicious network flow. It is a further challenge to provide a trusted entity, which enables a more effective analysis of malicious network flow. It is a further challenge to provide a computer program, which enables a more effective analysis of malicious network flow.

SUMMARY OF THE INVENTION

According to one aspect of the invention, a method for operating a network monitoring entity is provided comprising provisioning of network flow records from several administrative domains to the network monitoring entity. The method further comprises analyzing the network flow records in a way to locate a source of a malicious network flow. It is thereafter preferable to provide serviced entities with a result of that analysis. A malicious network flow may be anything which may create harm or constitute unwanted network traffic, e.g. spam, viruses, worms, denial of service attacks, in particular dDoS, and the like. Preferably, the various administrative domains are together situated in a multinational environment, in particular a global environment. The network monitoring entity is also referred to as trusted entity. The reception of the network flow records from the administrative domains does not necessitate that the network flow records must be received directly from these administrative domains. In a preferred embodiment the network flow records are received from observation points that are associated with several administrative domains. The network monitoring entity thereby obtains a collective view of network flows that are located in different administrative domains. This view is used for the analysis and can be used for reporting and even for corrective action.

According to this first aspect, it is possible to base analysis on activities within the various administrative domains and in that way to have an inter-administrative domain scope, in particular a global scope, enabling detection of the respective source of malicious network flow, which is in many cases impossible within the scope of the respective administrative domain. In this way, a more efficient trace back to where a malicious network flow originates is possible.

According to a preferred embodiment of the first aspect, the step of analyzing the network flow is conducted when a trigger event is received from one of the various administrative domains. In that way, local, i.e. intra-domain, knowledge of hints for a malicious network flow within the respective administrative domain may be exploited. This enables to react quicker to a malicious network flow and also enables to more efficiently allocate calculating resources within the trusted entity.

According to a further preferred embodiment, the step of analyzing the network flow is conducted when a trigger event is received from one of the serviced entities. In that way, local knowledge of hints for a malicious network flow within the respective serviced entities may be exploited. This enables to react quicker to a malicious network flow and also enables to more efficiently allocate calculating resources within the trusted entity.

According to a further preferred embodiment of the first aspect, the trigger event has a trigger network flow record associated to it. Information content of the trigger network flow record is used when analyzing the network flow records. This enables to exploit the additional information provided by the trigger network flow record to more efficiently detect the respective source of malicious network flow in a faster way.

According to a further preferred embodiment of the first aspect, a trigger event comprises a spam signal and the trigger network flow record comprises at least part of a content of a spam message. This enables to exploit the additional information of the spam message to detect the source of a malicious network flow in a faster way.

According to a further preferred embodiment of the first aspect, a trigger event comprises a virus or worm signal. This enables to allocate calculating capacity streamlined to situations where a more intensive analysis is useful.

According to a further preferred embodiment of the first aspect, the result of the analysis comprises a characteristic for the source of malicious network flow. This enables to take actions against the source of malicious network flow, like legal actions or isolating the source of malicious network flow from the network.

According to a further preferred embodiment of the first aspect, the trusted entity requests additional network flow information for a given set of network flows from at least one of the administrative domains for the analysis, preferably when the analysis is to be conducted or while the analysis is conducted. This enables to improve the process of finding the source of malicious network flow while sparing resources. It may, in particular, be advantageous if the additional network flow information for the given set of network flows is requested when a given trigger event is received.

According to a further preferred embodiment of the first aspect, the serviced entities are charged fees based on the respective amount of the subscribers. This is easier to conduct and gives the serviced entities a more reliable cost calculation basis. It even seems likelier to be accepted by the respective subscribers that possibly the fees are imposed on them bearing the advantage in mind that malicious network flow may be more efficiently contained.

According to a further preferred embodiment of the first aspect, the serviced entities comprise administrative domains. This enables the administrative domains to profit from the inter-administrative domain information received by the trusted entity, which for business reasons are more unlikely to be openly exchanged between the respective administrative domains. This then enables to prevent malicious network flow from congesting the respective administrative domain and in that way may free resources of the respective domain for profitable data traffic.

According to a further preferred embodiment of the first aspect, serviced entities being administrative domains are charged based on the amount of network flows reported within the respective administrative domain. This is in particular a fairer calculation base as the amount of network flows may be representative for the size of the respective administrative domain.

According to a further preferred embodiment of the first aspect, the serviced entities comprise police authorities. This enables to conduct surveillance of suspect entities based on court authorization.

According to a further preferred embodiment of the first aspect, the results from the analysis comprise a spam characteristic. This enables the serviced entities to, e.g., block spam directly at their respective observation points or other points within their network and thereby more efficiently reducing their network load.

According to a second aspect of the invention, a trusted entity is adapted to be provided with network flow records from various administrative domains, to analyze the network flow records in a way to locate a source of malicious network flow and to provide serviced entities with a result from that analysis. The second aspect of the invention corresponds with its preferred embodiments and its advantages to the first aspect.

According to a third aspect, a computer program product is provided comprising a computer readable medium embodying program instructions executable by a computer for performing the steps of the method according to the first aspect.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

In FIG. 1 a global network is depicted, like the Internet, that comprises various administrative domains AD1-AD5. Preferably, the administrative domains AD1-AD5 are Internet service providers. The Internet service providers work on networks that are not limited by region or company structures, however, some of the Internet service providers may also only work on regionally limited networks like networks limited to one country, or limited to a corporate network. An inter-administrative domain communication is achieved by peer-to-peer connections between respective peering points, also referred to as observation points, of respective administrative domains AD1-AD5. An observation point is e.g. a location in the network where IP data packets can be observed. Examples include: a line to which a probe is attached, a shared medium, such as an Ethernet-based LAN, a single port of a router, or a set of interfaces (physical or logical) of a router.network traffic. The administrative domains AD1-AD5 may have peer-to-peer connections to several other of the administrative domains AD1-AD5. If two administrative domains AD1-AD5 do not have a peer-to-peer connection, then communication between them may be accomplished by using one or several of the administrative domains AD1-AD5 as a transit administrative domain. Data traffic within the network is data packet-oriented. The various data packets preferably have the format of the Internet protocol and are therefore IP-data packets.

Figure 1:
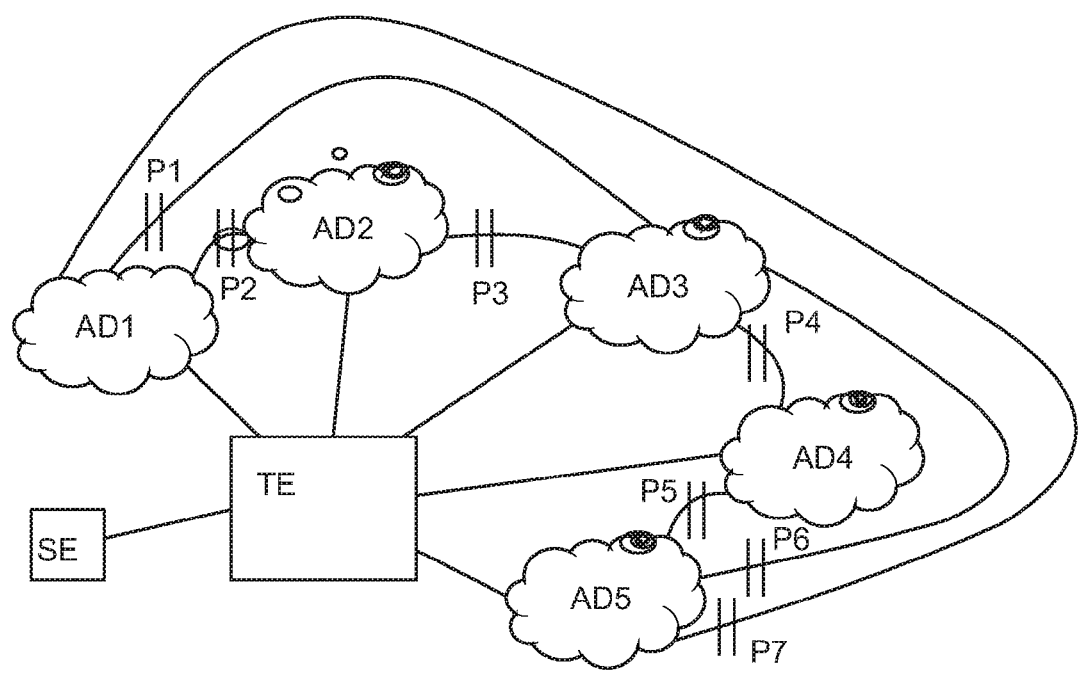
FIG. 1, an exemplary representation of a global network,
FIG. 2, a more detailed representation of three administrative domains of the global network according to FIG. 1,
FIG. 3, a network flow chart of a first program for operating a trusted entity, and FIG. 4, a network flow chart of a second program for operating the trusted entity.

A network flow is defined as a set of data packets passing an observation point P1-P10 in the network during a given time interval. All data packets belonging to a particular network flow have a set of common properties. Each property is defined as the result of applying a function to the values of:
  one or more data packet header fields, e.g. destination IP address, transport header field, e.g. destination port number, or application header field, e.g. RTP header fields RTP-HDRF,
  one or more characteristics of the data packet itself, e.g. number of MPLS labels,
  one or more fields derived from data packet treatment, e.g. next hot IP address, output interface.

A data packet is said to belong to a particular network flow, if it satisfies all the defined properties of the respective network flow. In this way, a network flow may contain all data packets observed at an observation point P1-P10 to a further network flow consisting of just a single data packet between two applications. It further includes data packets selected by a sampling mechanism.

A network flow record FR contains information about a specific network flow that was observed at one of the observation points P1-P10. The network flow record FR contains measured properties of the network flow, for example a total number of bytes for all the network flow data packets, and other characteristic properties of the network flow, e.g. source and/or destination IP address, and/or port number.

Within the respective observation points P1-P10, a measuring step is performed which generates the network flow records FR. Inputs thereto can be data packet headers and characteristics observed at the respective observation point P1-P10 and also one or more parameters of the data packet treatment at the observation point P1-P10, for example the selected output interface. The measurement within the measuring step may be conducted from the point of view of the observation point P1-P10. The measuring step may comprise a set of functions such as a data packet header capturing, time stamping, sampling, classifying and maintaining the network flow records FR. The maintenance of the network flow records FR may include any of the following steps: creating new network flow records FR, updating existing ones, computing network flow statistics, deriving further network flow properties, detecting network flow exploration, exporting network flow records FR, and/or deleting network flow records FR.

A network monitoring entity is provided, which is adapted to be provided with network flow records FR from the various administrative domains AD1-AD5. This network monitoring entity is an entity that performs a network monitoring function, and receives information from and delivers information to other entities. This kind of function is then used to handle network traffic and to make decisions on the nature of the network traffic, and on the handling to be done with such network traffic. Since the information such handling is based on is critical to the performance of the network, the network monitoring entity has an important function in the network. Typically the function of the network monitoring entity is trusted by other entities in the network more than entities who send network traffic over this network that is monitored by the network monitoring entity. So in a preferred embodiment the network monitoring entity is trusted to a higher degree than other entities in the same network. For this reason the network monitoring entity is also referred to in the following as trusted entity TE.

Several administrative domains AD1-AD5 provide the trusted entity TE with respective network flow records FR. This has the advantage that the trusted entity TE has a better overview, in particular possibly a global overview, of the network flow taking place within the global network. The trusted entity TE is accepted by the administrative domains AD1-AD5 as a neutral entity, i.e. it is a policy within the trusted entity TE not to favor any of the administrative domains AD1-AD5 over another. The amount of information contained in the respective network flow records FR received by the trusted entity TE from the respective administrative domains AD1-AD5 is scalable and may be a subject of negotiation of the level of detail to which the respective administrative domains AD1-AD5 are willing to provide to the trusted entity TE with information. The observation points P1-P7 and P8-P10 are each associated to one of the respective administrative domains AD1-AD5.

Serviced entities SE may be one or more of the administrative domains AD1-AD5 or also other entities, such as police authorities or the like.

Figure 3:
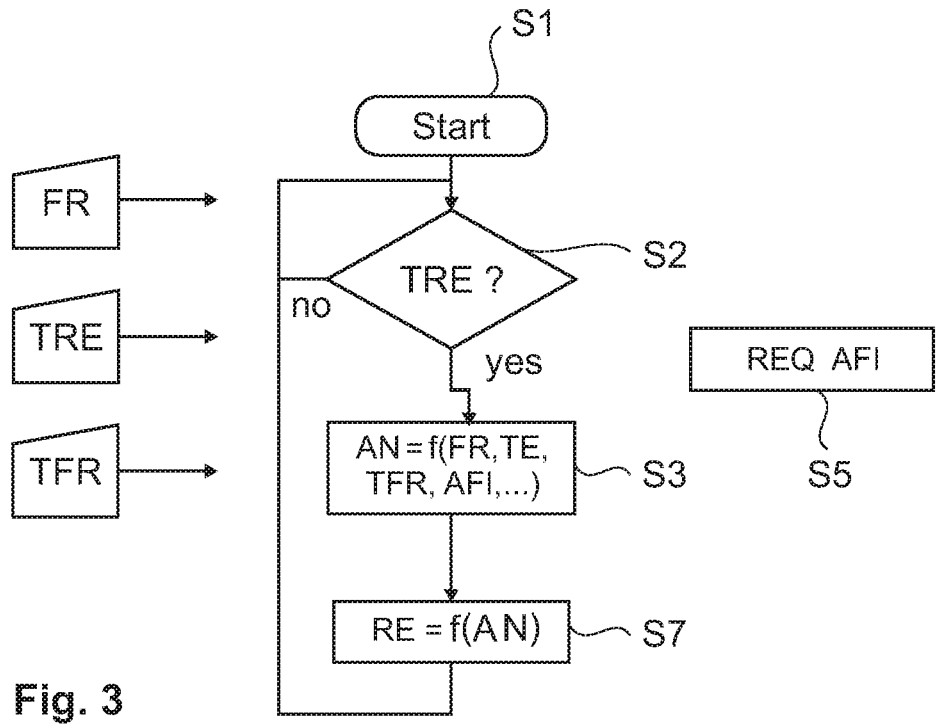

For operating the trusted entity TE, a program is provided and run within the trusted entity TE, described in the following with the aid of the FIGS. 3 and 4. A first program (FIG. 3) is started in a step S1. The trusted entity TE is provided with network flow records FR. The trusted entity TE is further provided, whenever generated by one of the administrative domains AD1-AD5 or one of the serviced entities SE by trigger events TRE and/or optionally, with associated trigger network flow records TFR. The respective trigger events TRE may be based on local knowledge, i.e. knowledge coming from within the respective administrative domain AD1-AD5 or the respective serviced entity SE, about a potential malicious network flow or an already detected malicious network flow. A malicious network flow can be herein understood as a network flow that has a volume that is higher than necessary for distributing the contained message, hence multiplied in order to generate more network traffic than necessary. Also, a malicious network flow can be a network flow that has been generated with the intent to harm entities connected to the network, for instance by exhausting their available resources, thereby causing system outage or malfunction.

A trigger event TRE may advantageously be, for example, a spam signal that may be generated by one of the administrative domains AD1-AD5 if, for example, some of the end user machines EM1-EM5 report the receipt of spam network traffic, i.e. spam messages. In this event, a trigger network flow record TFR is created, comprising preferably a copy of the entire or part of the spam message or a digest of the spam message, e.g., a hash or a signature. The principal content of the spam message such as a URL, phone number or certain ID in the respective header may be used to group various spam signals received by the trusted entity TE caused by an identical or substantially similar spam message.

For obtaining the network flow records FR and also the trigger network flow records TFR, preferably the IPFIX measurement and exporting process may be exploited which is currently subject to standardization by the IETF. The trigger event TRE may for example also be a virus or worm signal.

In an event checking step S2, it is checked whether a trigger event TRE has been received by the trusted entity TE. If this is not the case, then the condition of the event checking step S2 is checked again after the course of a given time. If the condition of the event checking step S2 is, however, satisfied, then an analysis AN is conducted in an analysis step S3. The analysis AN may be based on one or more of the received network flow records FR, the trigger events TRE, the trigger network flow records TFR, additional network flow information AFI, and possibly further information. When a trigger event TRE is received or during conduction of the analysis AN, the additional network flow information AFI may be requested in a request step S5. This may be accomplished by a template provided by the IPFIX protocol which is an ordered sequence of type, length pairs used to completely specify the structure and semantics of a particular set of information that needs to be communicated. For example, upon receipt of a trigger event TRE, it may be requested by the trusted entity TE from the respective administrative domain AD1-AD5 to communicate to the trusted entity TE a specific part of network flows FR received during a predetermined subsequent time interval. In this way, for example, the first 100 bytes of respective network flows may be reported to the trusted entity TE during that time interval enabling the trusted entity TE to conduct a more thorough and effective analysis AN and, on the other hand, scaling the information depth in order to limit the overall amount of information received by the trusted entity TE, e.g. to an amount that is sufficient for the analysis AN.

The analysis AN preferably comprises correlating the respective network flow records FR, in particular with the trigger network flow records TFR and/or the additional network flow information AFI. Depending on the type of malicious network flow to detect or to detect the source of a malicious network flow, the analysis AN may also be conducted on a repetitive basis, independent of the trigger events TRE. For example, maps of traffic patterns may be generated which may enable to trace back where a worm or a denial of service attack, in particular a distributed denial of service attack, originates and also to warn from upcoming denial of service attacks or also worm infections.

In a result step S7, a result RE from the analysis AN is obtained. It may comprise a characteristic for the source of the malicious network flow. Depending on the depth of information available and preferably also on the agreed upon privacy policy, for example the respective IP source address may be part of the result RE. In other cases, it may comprise the respective identification of the respective administrative domain AD1-AD5 or some other sort of identification.

This then enables respective other administrative domains AD1-AD5 to, for example, block network traffic from the source of the malicious network flow and in that way to free their network from the respective malicious network flow, possibly reducing the network flow load within their respective network. In that way, a change in fighting against malicious network flow is obtained. Contrary to blocking malicious network flow at an end user machine EM1-EM5, the malicious network flow may be prevented from even entering the respective administrative domain AD1-AD5. In that way, on the one hand, the network traffic caused by the malicious network flow may be reduced and also the end user machine EM1-EM5 is relieved from the need to permanently protect itself from malicious network flow. In that way, it is assumed that participating with the trusted entity TE may be considered by subscribers of the respective administrative domains AD1-AD5 as a benefit for themselves and it is therefore an argument for subscribing to the administrative domains AD1-AD5 which provide the trusted entity TE with network flow records FR and also are serviced entities SE of the trusted entity TE. The above explained action that is performed in response to the result step S7, is in another preferred embodiment initiated or executed by the trusted entity TE itself. Also, the observation points P1-P10 could be equipped with means to perform or relay performance of such corrective action at the appropriate location.

The concept of the trusted entity TE may also have the consequence that the administrative domains AD1-AD5 who are not willing to participate in providing the trusted entity TE with respective network flow records FR may be brought in discredit or that peering connections to such administrative domains may be cut from respective other administrative domains. This increases the pressure for non-participating administrative domains to nonetheless participate in providing the trusted entity TE with respective network flow records FR.

While conducting the analysis AN in the analysis step S3, the trusted entity TE may construct a higher level output such as a map describing, for example, an intensity of outgoing SMTP connections at nodes in the network. By enabling the feature of providing the trusted entity TE with network flow records FR from the various administrative domains AD1-AD5, it is not necessary to add intrusive software in the observation points P1-P10 themselves.

The availability of the network flow records FR from the various administrative domains AD1-AD5 allows the trusted entity TE to trace back the path in a transitive way through multiple administrative domains AD1-AD5 of supposed malicious network flow.

Figure 2:
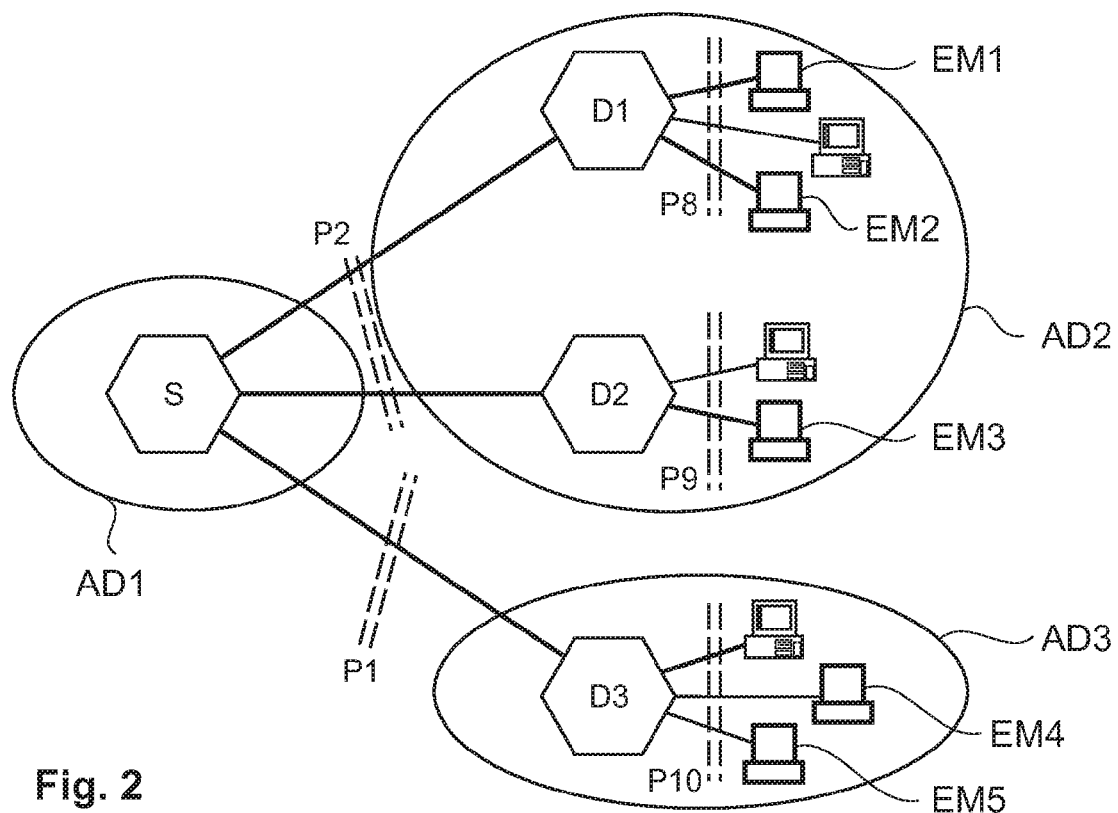
FIG. 2 shows a more detailed view of three of the administrative domains AD1-AD3. D1 to D3 and S represent nodes, e.g. SMTP servers, within the respective administrative domains which may then have connections to respective end user machines EM1-EM5. P1-P7 (FIG. 1) denote the observation points for the observation of peer-to-peer connections, and P8-P10 (FIG. 2) denote further observation points in the respective administrative domains AD2, AD3.

One source of malicious network flow that may be detected by the trusted entity may, for example, be spam. In FIG. 2 as an example the spam is detected by end user machines EM1, EM2 associated to network node D1 within the administrative domain AD2, end user machine EM3 associated to network node D2 within the administrative domain AD2, and end user machines EM4, EM5 associated to network node D3 within the administrative domain AD3. Each of them triggers a spam signal that is forwarded as a spam trigger event TRE to the trusted entity TE. Together with the trigger event TRE, a trigger network flow record TFR is transmitted to the trusted entity TE. The trigger network flow record TFR preferably comprises at least part of the spam message. It may comprise content of the spam message, such as a URL, a phone number, or a certain ID in the message header. The various trigger events TRE and trigger network flow records TFR received in the trusted entity TE are correlated and preferably grouped together. The trusted entity TE correlates the network flow records FR from the respective observation points P8, P9, P10 to the spam signals. As a result, the source IP address of the respective spam message, for example the network node addresses D1-D3, respectively, is found. To perform the correlation during the analysis step S3 at the trusted entity TE, e-mail size, SMTP header, IDs, port number, time, payload fingerprint/digests and the like may be used.

The trusted entity TE may possibly verify that the network nodes D1-D3 were relays to the spam message by scanning through their respective mail log. This is optional as the trusted entity TE may not have access to the log.

To trace back to the network node S which in this example is the source of the malicious network flow, the trusted entity TE correlates the information collected by and received from the observation points P1 and P2 to find possible SMTP connections, SSH or TELNET sessions that ended at the network nodes D1-D3. This then allows to identify the network node S as the source of the spam message. Then, the trusted entity TE may generate a respective signature enabling the respective administrative domains AD1-AD5 that are also serviced entities SE to block respective spam messages.

The analysis AN may also be used to detect viruses and worms and to perform a trace-back. Viruses and worms are at some point of time injected into the Internet and then spread to more and more network devices like in the case of spam mail. The spreading is typically achieved over unprotected TCP/UDP ports and vulnerable applications handling the ports, for example creating buffer overflow. The spreading pattern is also more likely to be exponential in growth, since one infected machine typically infects more than one other machine. The trusted entity TE with a history, also referred to as trusted history, of collected traffic profiles obtained from the received network flow records FR may correlate traffic rates on specific TCP/UDP ports over a predetermined time-frame of that history, such as a relatively short piece of that history. The initial trigger event TRE for starting the correlation step may come from an intrusion detection device. Once then a malicious traffic pattern is identified in terms of TCP/UDP port activity, IP header flags, IP data packet signatures, or the like, the correlation step may be limited to the notified pattern.

During the analysis, also a statistical analysis may be performed and, for example, a typically wave-like propagation of the malicious network flow may be detected. Worms may be, for example, also be detected when receiving a respective trigger event TRE or also independently from such a trigger event TRE by performing an analysis AN of the network traffic and knowing that worms typically spread out like mushrooms in a star-formed way opening up a number of connections. By detecting such traffic patterns with the enhanced view of the trusted entity TE, enabled by the reception of the network flow records (FR) the originally infected nodes S, D1-D3 may be detected. Statistical models are useful in the presence of mailing list-type of traffic, such as customer newsletters, etc, to separate malicious traffic from regular traffic.

Also denial of service attacks, especially distributed denial of service attacks, referred to as dDoS attacks, typically have a pattern of a star-formed activity in various network nodes and then having an increased activity towards a singular end user machine from the respective network nodes D1-D3, S.

The more globalized view of the trusted entity TE enables to detect respective activities within one of the administrative domains AD1-AD5. A local scope, i.e. one that is restricted to one of the administrative domains AD1-AD5 would not be sufficient to detect and act upon the beyond-local activity that certain forms of malicious network flow unfold. Typically, such dDoS attacks do not have a local source, but use several sources distributed amongst the various administrative domains AD1-AD5.

The serviced entity SE may also, for example, be a government authority, a military organization, an office, a police authority or the like, or any other entity which has e.g. by a court decision the empowerment to perform an e-mail interception. Such a surveillance of e-mail traffic of a given e-mail account may also be a service provided from the trusted entity TE. It may, for example, be accomplished by requesting in the request step S5 the additional network flow information AFI focused on a given e-mail account and comprising, for example, the content or part of the content of the respective e-mails. In this way, the respective police authorities have a chance to make the e-mail interception without having to address the respective administrative domains AD1-AD5. Such an e-mail interception is preferably only performed by the trusted entity TE if agreed-upon rules and known rules are obeyed in order to keep the neutrality of the trusted entity TE and also to keep trust in the operation of the trusted entity TE. Also, this service can be charged for by the trusted entity TE.

Figure 4:
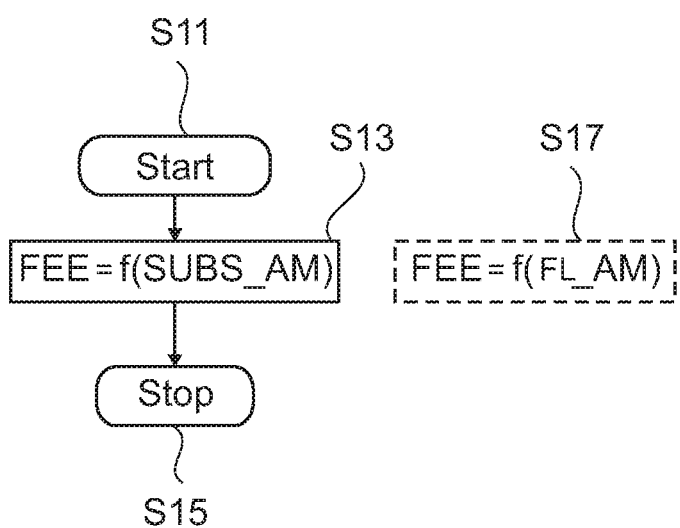

For charging fees, a second program is started in a step S11 (FIG. 4). In a first fee calculation step S13, a fee is calculated for the respective serviced entity SE, which may include one or more of the administrative domains AD1-AD5 based on their respective amount SUBS_AM of subscribers. This forms for the respective administrative domain AD1-AD5 a simpler cost calculation basis as usually their respective fees are also charged individually to the respective subscribers. If the respective administrative domain AD1-AD5 then also is a serviced entity SE, the respective subscribers might appreciate the administrative domains' AD1-AD5 participation in providing the trusted entity TE with network flow records FR and using the result RE of the analysis AN of the trusted entity TE and in that way reduce the amount of malicious network flow within the respective administrative domain's network and therefore being able to possibly offer a better service level to the respective subscriber and also more efficiently protecting the respective subscriber from malicious network flow.

This might even lead to a willingness of the respective subscriber to pay an add-on on the usual subscriber fee for the services provided by the trusted entity TE to the respective administrative domain AD1-AD5. Alternatively, the respective fees may be calculated in a second fee calculation step S17 based on the respective amount FL_AM of network flow within the network of the respective administrative domain AD1-AD5. In that way, the respective administrative domain AD1-AD5 would be even more motivated to utilize the result RE obtained by the analysis AN and thereby more efficiently blocking malicious network flow from flowing through its network. Also, a combination of the way the fees are calculated in the fee calculation steps S13, S17 is feasible. Also other parameters may be taken into consideration when calculating the respective fee FEE.

The more administrative domains AD1-AD5 participate in providing the trusted entity TE with network flow records FR, the more thorough is the global overview of the network traffic, especially within the Internet, by the trusted entity TE and the more efficiently the respective sources of malicious network flow may be identified by the trusted entity TE. In this way, the overall amount of malicious network flow within the network may be reduced, thereby freeing resources and making the network safer. In that way, all the participating administrative domains AD1-AD5, in particular if they also act as serviced entities SE, would have a greater benefit for each of them. Non-participating administrative domains AD1-AD5 might be pressured to participate within the data exchange with the trusted entity TE or might otherwise lose subscribers or also have problems getting peer-to-peer connections to other administrative domains AD1-AD5.

The method for operating the trusted entity TE may be implemented in part or as a whole in software or hardware or a combination thereof. The method may be implemented in software. A computer program product may be provided on a computer-readable medium embodying software instructions executable by a computer to perform the steps of the method. The computer-readable medium may, for example, be a CD-ROM, a DVD, flash memory card, a hard disk or any other suitable computer-readable medium, e.g. a storage medium within a network.

The invention claimed is:

1. A method for operating a network monitoring entity (TE) to detect malicious network flow in a distributed network comprising at said network monitoring entity (TE) the steps of:
   receiving network flow records (FR) from observation points in a plurality of different distributed administrative domains (ADs), each network flow record comprising measured properties of network flow of a set of data packets passing each observation point during a time interval;
   performing an analysis (AN) of the network flow records (FR) to locate a source of malicious network flow by correlating network flow records with at least one of additional network flow records, trigger events, trigger flow records, and additional network flow information, constructing a higher level output, and analyzing the higher level output for at least one of a traffic profile, a traffic rate, and a traffic pattern indicative of malicious network flow and a source of the malicious network flow; and
   providing serviced entities (SE) with a result (RE) of the analysis (AN).

2. The method according to claim 1, wherein the analysis step (S3) is conducted when a trigger event (TRE) is received from one of the administrative domains (ADs) or one of the serviced entities (SE).

3. The method according to claim 2, wherein the trigger event (TRE) has a trigger network flow record (TRF) associated to it, and wherein information content of the trigger network flow record (TFR) is used in the analysis.

4. The method according to claim 3, wherein the trigger event (TRE) comprises a spam signal and the trigger network flow record (TFR) comprises at least part of a respective spam message.

5. The method according to claim 3, wherein the trigger event (TRE) comprises one of a virus signal and a worm signal.

6. The method according to claim 1, wherein the result (RE) comprises a characteristic for the source of the malicious network flow.

7. The method according to claim 1, further comprising a request step (S5) of the trusted entity (TE) requesting additional network flow information (AFI) for a given set of network flows from at least one of the administrative domains (ADs) for the analysis (AN).

8. The method according to claim 1, further comprising the step of charging the serviced entities fees based on a respective amount (SUBS_AM) of subscribers.

9. The method according to claim 1, wherein the serviced entities (SE) comprise at least one of the administrative domains (ADs).

10. The method according to claim 9, wherein the serviced entities (SE) comprise at least one of the administrative domains (ADs) being charged based on the amount (FL_AM) of network flows reported within the respective administrative domain (AD).

11. The method according to claim 1, wherein the serviced entities (SE) comprise one of a governmental, police, office, and military authority.

12. The method according to claim 1, wherein the result (RE) comprises a spam characteristic.

13. The method according to claim 1 wherein analyzing the higher level output comprises correlating traffic rates on specific ports to trace back at least one of a virus or worm to an injection point in the network as a source of malicious network flow.

14. The method according to claim 1 wherein generating the higher level output comprises generating a map of traffic patterns based on the network flow records.

15. The method according to claim 14 wherein analyzing the higher level output comprises detecting a traffic pattern spreading out like mushrooms in a star-formed way to identify at least one node originally infected with a worm.

16. The method according to claim 14 wherein analyzing the higher level output comprises detecting a traffic pattern of star-formed activity in multiple nodes with increased activity toward a single destination to identify a denial of service attack.

17. A network monitoring entity to detect malicious network flow in a distributed network comprising:
   a receiving component for receiving network flow records (FR) from observation points in a plurality of different, distributed administrative domains (ADs), each network flow record comprising measured properties of network flow of a set of data packets passing each observation point during a time interval;
   an analysis component for performing an analysis (AN) on the network flow records (FR) in a way to locate a source of malicious network flow by correlating network flow records with at least one of additional network flow records, trigger events, trigger flow records, and additional network flow information, constructing a higher level output, and analyzing the higher level output for at least one of a traffic profile, a traffic rate, and a traffic pattern indicative of malicious network flow and a source of the malicious network flow; and
   a notification component for providing serviced entities (SE) with a result (RE) of the analysis (AN).

18. A non-transitory computer program product comprising a computer-readable medium storing program instructions executable by a processor to perform a method for operating a network monitoring entity (TE) to detect malicious network flow in a distributed network, said method comprising at said network monitoring entity (TE) the steps of:
   receiving network flow records (FR) from observation points in a plurality of different distributed administrative domains (ADs), each network flow record comprising measured properties of network flow of a set of data packets passing each observation point during a time interval;

performing an analysis (AN) of the network flow records (FR) to locate a source of malicious network flow by correlating network flow records with at least one of additional network flow records, trigger events, trigger flow records, and additional network flow information, constructing a higher level output, and analyzing the higher level output for at least one of a traffic profile, a traffic rate, and a traffic pattern indicative of malicious network flow and a source of the malicious network flow; and providing serviced entities (SE) with a result (RE) of the analysis (AN).

* * * * *